United States Patent
Yamamura et al.

(10) Patent No.: US 8,431,212 B2
(45) Date of Patent: Apr. 30, 2013

(54) LAMINATE SHEET OF POLYLACTIC ACID-BASED RESIN AND THERMOFORMED PLASTIC THEREOF

(75) Inventors: Go-hei Yamamura, Otsu (JP); Hiroshi Shinnumadate, Otsu (JP); Masahiro Kimura, Kyoto (JP)

(73) Assignee: Toray Industries, Inc. (JP)

( * ) Notice: Subject to any disclaimer, the term of this patent is extended or adjusted under 35 U.S.C. 154(b) by 878 days.

(21) Appl. No.: 11/990,949

(22) PCT Filed: Jul. 28, 2006

(86) PCT No.: PCT/JP2006/314949
§ 371 (c)(1), (2), (4) Date: Feb. 25, 2008

(87) PCT Pub. No.: WO2007/026489
PCT Pub. Date: Mar. 8, 2007

(65) Prior Publication Data
US 2009/0053489 A1    Feb. 26, 2009

(30) Foreign Application Priority Data

Aug. 31, 2005 (JP) ................................ 2005-251031

(51) Int. Cl.
*B32B 27/36* (2006.01)
*B32B 7/02* (2006.01)

(52) U.S. Cl.
USPC ............................. 428/213; 428/220; 428/480

(58) Field of Classification Search .................. 428/480, 428/483; 528/354
See application file for complete search history.

(56) References Cited

U.S. PATENT DOCUMENTS

| | | | |
|---|---|---|---|
| 6,312,823 B1 * | 11/2001 | El-Afandi et al. | 428/480 |
| 6,372,331 B1 * | 4/2002 | Terada et al. | 428/212 |
| 6,803,443 B1 * | 10/2004 | Ariga et al. | 528/354 |
| 2002/0002252 A1 * | 1/2002 | Obuchi et al. | 525/450 |
| 2005/0165142 A1 * | 7/2005 | Nishimura et al. | 524/210 |

FOREIGN PATENT DOCUMENTS

| | | |
|---|---|---|
| JP | 9-278991 A | 10/1997 |
| JP | 11-5849 A | 1/1999 |
| JP | 2004-149692 A | 5/2004 |
| JP | 2005-119061 A | 5/2005 |
| JP | 2005-119062 | 5/2005 |
| JP | 2005-119062 A | 5/2005 |
| JP | 2005-144726 A | 6/2005 |
| JP | 2005-169815 A | 6/2005 |
| WO | WO01/70846 A1 * | 9/2001 |
| WO | WO03/074593 A1 * | 9/2003 |
| WO | WO 2004/069535 A1 | 8/2004 |

OTHER PUBLICATIONS

Ke et al. "Melting Behavior and Crystallization Kinetics of Starch and Poly(lactic acid) Composites". Journal of Applied Polymer Science, vol. 89, (2003); pp. 1203-1210.*
Machine Translation of JP 2005-119062. Retrieved Feb. 6, 2013.*

* cited by examiner

*Primary Examiner* — Maria Veronica Ewald
*Assistant Examiner* — Prashant J Khatri
(74) *Attorney, Agent, or Firm* — DLA Piper LLP (US)

(57) ABSTRACT

The laminate sheet of polylactic acid-based resin of the present invention is a laminate sheet comprising Layer A and Layer B consisting of polylactic acid-based resin composition and both of said Layer A and said Layer B contain a nucleating agent, and said Layer A and said Layer B contain said nucleating agent in a specific amount. The present invention makes it possible to obtain a thermoformed plastic excellent in heat resistance and transparency, and further, provides a laminate sheet of polylactic acid-based resin excellent in thermoformability.

10 Claims, No Drawings

LAMINATE SHEET OF POLYLACTIC ACID-BASED RESIN AND THERMOFORMED PLASTIC THEREOF

RELATED APPLICATIONS

This is a §371 of International Application No. PCT/JP2006/314949, with an international filing date of Jul. 28, 2006 (WO 2007/026489 A1, published Mar. 8, 2007), which is based on Japanese Patent Application No. 2005-251031, filed Aug. 31, 2005.

TECHNICAL FIELD

This disclosure relates to a laminate sheet of polylactic acid-based resin suitable for thermoformed plastics such as shape retaining tools or containers which require heat resistance and transparency, and to a thermoformed plastic made thereof.

BACKGROUND ART

Recently, accompanied by the increase of environmental awareness, waste disposal problem of plastic products has drawn attention. Regarding shape retaining tools used as presentation packaging for various articles and containers such as trays for food or beverage cups, those in which various biodegradable plastic sheets are used has been developed. Among them in particular, polylactic acid has mostly drawn attention as an expectable material, because its glass transition temperature is high as approximately 60° C. despite being a biodegradable plastic, or of its transparency.

However, the polylactic acid is low in glass transition temperature by approximately 20° C. compared to materials derived from petroleum, i.e., polyethylene terephthalate, and there is a problem that heat resistance is insufficient when used in each of present applications.

As a means for solving this problem, a technique is proposed in which the heat resistance is improved by increasing crystallinity of polylactic acid resin by incorporating a nucleating agent in the polylactic acid resin.

For example, in JP-H9-278991 A and JP-H11-5849 A, a technique is described in which crystallinity is increased by heat treating a polylactic acid sheet containing a transparent nucleating agent, at the time of thermoforming or after thermoforming. However, in this technique, since the nucleating agent is contained in the whole resin, the effect of crystallization of the sheet by heat at the time of thermoforming is significant, and there was a problem in thermoformability.

Furthermore, in JP 2004-149692 A, a technique is described in which a thermoformed article which is high in folding endurance and excellent in heat resistance is obtained by incorporating a nucleating agent to a polymer component consisting of a lactic acid component and mainly an aliphatic polyester component. However, by this technique, although folding endurance was improved, thermoformability of the sheet was insufficient.

Furthermore, in JP 2005-119061 A and JP 2005-119062 A, a polylactic acid-based sheet of which crystallization rate is high and folding endurance is large is proposed, by employing a two-types-three-layers sheet constitution consisting of, as the inner layers, a lactic acid-based polyester mainly consisting of an aliphatic polyester component of polylactic acid and a lactic acid component and, as the outer layer, a polylactic acid containing a transparent nucleating agent. However, in the technique disclosed here, there was a problem that transparency was deteriorated by heat treatment at the time of thermoforming.

It could therefore be advantageous to provide a laminate sheet of polylactic acid-based resin from which a thermoformed plastic excellent in heat resistance and transparency can be obtained and which is excellent in thermoformability.

SUMMARY

We provide laminate sheets of polylactic acid-based resin which are laminate sheets comprising Layer A and Layer B consisting of polylactic acid-based resin composition and both Layer A and Layer B contain a nucleating agent, and Layer A and Layer B satisfying the following condition:

$$0 < Xb < Xa$$

wherein
Xa: a containing ratio of the nucleating agent with respect to the whole polylactic acid-based resin composition constituting Layer A (% by mass)
Xb: a containing ratio of the nucleating agent with respect to the whole polylactic acid-based resin composition constituting Layer B (% by mass).

Furthermore, we provide a thermoformed plastic composed of the above-mentioned laminate sheet of polylactic acid-based resin.

The laminate sheet of polylactic acid-based resin is excellent in thermoformability, and a thermoformed plastic excellent in heat resistance and transparency can be obtained therefrom. The laminate sheet of polylactic acid-based resin can preferably be used in thermoformed plastic applications which include shape retaining tools such as various blister packs, containers which require heat resistance and transparency such as trays for food or cups for beverage, bottles for display of beverage vending machine which require heat resistance.

DETAILED DESCRIPTION

We made great efforts on the above-mentioned problems, i.e., on a laminate sheet of polylactic acid-based resin from which a thermoformed plastic excellent in heat resistance and transparency can be obtained and which is also excellent in thermoformability and, as a result, it was found that those problems can be solved simultaneously by laminating polylactic acid-based resin Layers A and B which contain specified compounds in specified amounts.

The laminate sheet of polylactic acid-based resin of the present invention is a laminate sheet containing Layer A and Layer B consisting of polylactic acid-based resin composition and both of said Layer A and said Layer B contain a nucleating agent, and it is necessary to satisfy the condition, $0 < Xb < Xa$. It preferably is $0 < 3Xb \leq Xa$, more preferably $0 < 5Xb \leq Xa$. Wherein,
Xa: a containing ratio of the nucleating agent with respect to the whole polylactic acid-based resin composition constituting said Layer A (% by mass)
Xb: a containing ratio of the nucleating agent with respect to the whole polylactic acid-based resin composition constituting said Layer B (% by mass).

In the case where a nucleating agent is not contained, heat resistance of laminate sheet itself or of thermoformed plastic becomes insufficient, and transparency of the thermoformed plastic after heat treatment deteriorates.

In the case where Xa and Xb do not satisfy the above-mentioned equation, it is not possible to make all of heat resistance, transparency and thermoformability compatible. That is, when a nucleating agent is added uniformly to whole laminate sheet up to an amount sufficient to impart desired heat resistance, an influence of resin crystallization at the time of thermoforming is significant, and thermoformability becomes insufficient. On the other hand, Xb=0, i.e., in the case where the nucleating agent is added in Layer A only, since large crystals are likely to grow in Layer B, transparency deteriorates. That is, by making a nucleating agent being contained in both of Layer A and Layer B and by making a big difference in the amounts contained of the nucleating agent between Layer A and Layer B, as well as imparting a sufficient heat resistance and transparency, a balance between heat resistance and thermoformability was made. Here, Layer A greatly contributes to the heat resistance and Layer B greatly contributes to the thermoformability. By this way, in the laminate sheet of polylactic acid-based resin of the present invention, all of heat resistance, transparency and thermoformability could be made compatible.

Regarding Layer A, the amount contained of the nucleating agent with respect to said whole resin composition constituting Layer A is preferably 0.1 to 2.5% by mass, more preferably 0.3 to 2% by mass and still more preferably 0.5 to 1.5% by mass. When the amount contained is smaller than 0.1% by mass, heat resistance and transparency may decrease. Even when the amount contained exceeds 2.5% by mass, the effect as a nucleating agent saturates and appearance or physical characteristics may change on the contrary.

Furthermore, regarding Layer B, it is preferable that the amount contained of the nucleating agent with respect to said whole resin composition constituting Layer B is 0.02 to 0.5% by mass, more preferably, 0.06 to 0.4% by mass, still more preferably 0.1 to 0.3% by mass. When the amount contained is smaller than 0.02% by mass, heat resistance or transparency may decrease. When the amount contained is larger than 0.5% by mass, thermoformability may deteriorate.

When Xa and Xb satisfy the above-mentioned equation, it is preferable in view of recyclability at the time of production of the laminate sheet of polylactic acid-based resin of the present invention. That is, in an actual production, edge portions of sheet or sheets which could not be sold are recycled, pelletized and recycled in most cases. At that time, if Xa and Xb satisfy the above-mentioned equation, for example, it is easy to dilute and use the recycled resins as a raw material of Layer B.

It is preferable that the ratio of respective thicknesses of the above-mentioned Layer A and Layer B with respect to the whole thickness of the laminate sheet of polylactic acid-based resin of the present invention is, in order to make the effects of both layers efficient, 10 to 90%. In the case where Layer A is less than 10%, heat resistance of said laminate sheet decreases. And, when Layer B is less than 10%, thermoformability deteriorate. More preferable respective ratio of Layer A and Layer B is 15 to 85% respectively, and especially preferably, it is 20 to 80%.

The laminate constitution of the laminate sheet of polylactic acid-based resin of the present invention may be two layers of Layer A and Layer B, or may also be three layers of A/B/A or B/A/B, and may be a multi-layer constitution of more than the above. And, it may include a third layer other than Layer A and Layer B.

Among these, it is most preferable to have a laminate structure containing at least 3 layers of A/B/A in which Layer A is disposed on both sides of Layer B. By disposing Layer A of which crystallinity is relatively high to the surfaces, the sheet becomes easy to slip with a metal mold at the time of thermoforming. And, in this case, in view of heat resistance and thermoformability, it is preferable that a ratio of thickness of Layer A with respect to the whole thickness of the sheet is 0.1% or more and less than 50%. Here, the ratio of thickness of Layer A is the ratio of sum of thickness of Layers A on both sides with respect to whole thickness of the sheet. When the ratio of thickness of Layer A is less than 0.1%, heat resistance of the laminate sheet decreases. The ratio of thickness of Layer A is more preferably 0.5% or more and still more preferably 1% or more. And, when the ratio of thickness of Layer A is 50% or more, thermoformability of the laminate sheet decreases. The ratio of thickness of Layer A is, more preferably 45% or less and still more preferably 40% or less.

In the case where a laminate structure containing three layers of B/A/B in which Layer B is disposed on both sides of Layer A is employed, there is a merit that surface glossiness is improved by disposing Layer B of which crystallinity is relatively low on the surfaces, but in view of heat resistance, it is disadvantageous compared to the A/B/A structure.

The whole thickness of the laminate sheet of polylactic acid-based resin of the present invention is not especially limited, but it is preferable to be 50 to 2000 μm. More preferably, it is 100 to 1500 μm and still more preferably 200 to 1000 μm. In the case where the film thickness is smaller than 50 μm, a film breakage is likely to occur at the time of thermoforming, and not only its thermoformability aggravates but also strength of the thermoformed plastic is likely to decrease even if it could be thermoformed. And, in the case where the film thickness if larger than 2000 μm, a long heating time before thermoforming may become necessary, or the film is apt to become brittle.

The polylactic acid-based resin used in the present invention is a polymer of which main constituent is L-lactic acid and/or D-lactic acid unit, but it may contain other monomer unit than lactic acid. As the other monomers, glycol compounds such as ethylene glycol, propylene glycol, butane diol, heptane diol, hexane diol, octane diol, nonane diol, decane diol, 1,4-cyclo-hexane dimethanol, neopentyl glycol, glycerin, pentaerythritol, bisphenol A, polyethylene glycol, polypropylene glycol and polytetramethylene glycol, dicarboxylic acids such as oxalic acid, adipic acid, sebacic acid, azelaic acid, dodecane dioic acid, malonic acid, glutaric acid, cyclo-hexane dicarboxylic acid, terephthalic acid, isophthalic acid, phthalic acid, naphthalene dicarboxylic acid, bis(p-carboxyphenyl) methane, anthracene dicarboxylic acid, 4,4'-diphenyl ether dicarboxylic acid, 5-sodium sulfoisophthalic acid and 5-tetrabutyl phosphonium isophthalic acid, hydroxycarboxylic acids such as glycolic acid, hydroxypropionic acid, hydroxybutyric acid, hydroxyvaleric acid, hydroxycaproic acid and hydroxybenzoic acid, lactones such as caprolactone, valerolactone, propiolactone, undecalactone and 1,5-oxepane-2-on, can be mentioned. Regarding the amount of copolymerization of the above-mentioned other monomer unit with respect to the whole polylactic acid-based resin, 0 to 30 mol % is preferable and 0 to 10 mol % is more preferable.

Regarding weight average molecular weight of polylactic acid-based resin used in the present invention, in order to satisfy an appropriate film-forming ability, stretchability and practical mechanical characteristics, 50,000 to 500,000 is preferable and more preferably, it is 100,000 to 250,000. However, the weight average molecular weight mentioned here denotes a molecular weight measured by gel permeation chromatography (GPC) in chloroform solvent and calculated by the PMMA-conversion method.

In the laminate sheet of polylactic acid-based resin of the present invention, it is preferable that a relation between a containing ratio Da (mol %) of D-lactic acid unit in the polylactic acid-based resin constituting Layer A, and a containing ratio Db (mol %) of D-lactic acid unit in the polylactic acid-based resin constituting said Layer B is $$Da<Db,$$

in view of easy developing crystallization effects as expected in Layer A and Layer B, respectively. In polylactic acid-based resin, depending on containing ratio of D-lactic acid unit, crystallinity of the resin itself changes. That is, when a containing ratio of D-lactic acid unit becomes high, crystallinity decreases to approach to be amorphous, on the contrary, when containing ratio of D-lactic acid unit decreases, crystallinity increases to be high. For that reason, by making Da and Db into the above-mentioned relation, it becomes possible to impart to respective layers of Layer A and Layer B of the present invention a crystallinity to the extent expected, and it becomes easy to make heat resistance, transparency and thermoformability compatible.

It is preferable that the containing ratio of D-lactic acid unit is, in Layer A, 0.2 to 4 mol % in the polylactic acid-based resin. More preferably, it is 0.3 to 3 mol % and still more preferably 0.5 to 2 mol %. In Layer B, it is preferable to be 1 to 15 mol % in the polylactic acid-based resin, more preferably 1.2 to 10 mol %, and still more preferably 1.5 to 5 mol %.

Furthermore, the polylactic acid-based resin composition may contain 0 to 80% by mass of other resin than the polylactic acid-based resin. As the resins other than the polylactic acid-based resin, for example, thermoplastic resins such as polyacetal, polyethylene, polypropylene, polyamide, poly(meth)acrylate, polyphenylene sulfide, polyether ether ketone, polyester, polysulfone, polyphenylene oxide, polyimide and polyether imide, thermosetting resins such as phenol resin, melamine resin, polyester resin, silicone resin and epoxy resin, soft-type thermoplastic resins such as ethylene/glycidyl methacrylate copolymer, polyester elastomer, polyamide elastomer, ethylene/propylene terpolymer and ethylene/butene-1copolymer, or the like are mentioned. Among these, in view of a good compatibility with the polylactic acid-based resin and improvement of glass transition temperature of the resin composition after compounding and capability of improving rigidity at high temperature, poly(meth)acrylate is preferable. The poly (meth)acrylate denotes those having at least one monomer selected from acrylate and methacrylate as its constituting unit and it may be used by copolymerizing 2 or more monomers. As the acrylate and methacrylate used for constituting the poly(meth)acrylate, for example, acrylates such as methyl acrylate, ethyl acrylate, n-propyl acrylate, n-butyl acrylate, cyanoethyl acrylate and cyanobutyl acrylate, and methacrylates such as methyl methacrylate, ethyl methacrylate, cyclohexyl methacrylate and 2-hydroxyethyl methacrylate, are mentioned. Among these, in order to impart a higher rigidity at high temperature and thermoformability to the resin composition, polymethyl methacrylate is preferably used.

Furthermore, as other resins than the polylactic acid-based resin, in view of imparting impact resistance and improvement of thermoformability, it is preferable that at least one layer selected from Layer A and Layer B contains 0.1 to 40% by mass Resin L of which glass transition temperature is 60° C. or lower, with respect to the whole polylactic acid-based resin composition which forms said layer. The amount contained is more preferably 0.2 to 30% by mass, especially preferably 0.5 to 20% by mass. When the amount contained of Resin L exceeds 40% by mass, heat resistance and transparency may decrease, and when the amount contained of Resin L is less than 0.1% by mass, improving effect of impact resistance decreases. It is preferable that Resin L is contained at least in Layer B in view of imparting impact resistance and improvement of thermoformability.

The weight average molecular weight of said Resin L is, in view of maintaining heat resistance and in view of compatibility with the polylactic acid-based resin, preferably 2,000 to 200,000, more preferably 5,000 to 100,000, especially preferably 10,000 to 80,000. However, the weight average molecular weight mentioned here denotes a molecular weight measured by gel permeation chromatography (GPC) in chloroform solvent and calculated by PMMA-conversion method.

As Resin L, a polyester, a block copolymer of polyester or polyalkylene ether with polylactic acid, a rubber or the like is preferably used.

In the case where a polyester is used as Resin L, it is preferable to be contained 0.1 to 10% by mass with respect to the whole polylactic acid-based resin composition which forms said layer. The amount contained is, more preferably 0.2 to 5% by mass and especially preferably 0.5 to 3% by mass.

In the case where a block copolymer of polyester or polyalkylene ether with polylactic acid, or a rubber is used as Resin L, it is preferable to be contained 5 to 40% by mass with respect to the whole polylactic acid-based resin composition which forms said layer. The amount contained is, more preferably 7 to 30% by mass and especially preferably 10 to 20% by mass.

As the polyester, aromatic and/or aliphatic polyesters such as polybutylene terephthalate, polypropylene terephthalate, polybutylene sebacate, polybutylene succinate, polybutylene succinate/terephthalate, polybutylene adipate/terephthalate, polybutylene succinate/adipate, polypropylene sebacate, polypropylene succinate, polypropylene succinate/terephthalate, polypropylene adipate/terephthalate and polypropylene succinate/adipate can be preferably used. Among these, especially effective for imparting impact resistance is, polybutylene adipate/terephthalate and polybutylene succinate/adipate.

Furthermore, the block copolymer of polyester or polyalkylene ether with polylactic acid is a block copolymer consisting of a polyester segment or a polyalkylene ether segment and a polylactic acid segment. It is preferable that the amount contained of the lactic acid component is 60% by mass or less in the copolymer. When the lactic acid component exceeds 60% by mass, effect of improvement of physical characteristics may decrease. Furthermore, it is preferable that the block copolymer has, in one molecule, one or more polylactic acid segment of molecular weight of 1,500 or more. In this case, by being embedded said polylactic acid segment in a crystal formed from the polylactic acid-based polymer which is the mother material, a function of being anchored to the mother material is developed, and a bleed out of said block copolymer can be prevented.

As the above-mentioned polyester segment, polybutylene terephthalate, polypropylene terephthalate, polybutylene sebacate, polybutylene succinate, polybutylene succinate/terephthalate, polybutylene adipate/terephthalate, polybutylene adipate/succinate, polypropylene sebacate, polypropylene succinate, polypropylene succinate/terephthalate, polypropylene adipate/terephthalate, polypropylene adipate/succinate or the like can be preferably used.

As the above-mentioned polyalkylene ether segment, polyethylene glycol, polypropylene glycol, polytetramethylene glycol, polyethylene glycol/polypropylene glycol copolymer or the like can be preferably used.

Furthermore, as the above-mentioned rubber, a polymer containing a silicone component, an acrylic component, a styrene component, a nitrile component, a conjugate diene component, a urethane component or an ethylene propylene component or the like is preferable, and a core-shell type multi-layer structure polymer is more preferable.

Next, the nucleating agent is explained.

In the present invention, in order to suppress an excessive growth of crystal of polylactic acid-based resin to make the crystal size fine, and in order to accelerate crystallization rate, a nucleating agent is used. It is necessary that such a nucleating agent increases crystallization rate of the polylactic acid-based resin, and when it is crystallized, it is necessary to maintain transparency of said resin. As such nucleating agents, an aliphatic carboxylic acid amide, an N-substituted urea, an aliphatic carboxylic acid salt, an aliphatic alcohol, an aliphatic carboxylic acid ester, an aliphatic/aromatic carboxylic acid hydrazide, a melamine-based compound, a phenyl-phosphoric acid metal salt or the like can be used. Among them, a compound selected from an aliphatic carboxylic acid amide, an N-substituted urea, an aliphatic carboxylic acid salt, an aliphatic alcohol and an aliphatic carboxylic acid ester can be preferably used.

As concrete examples of the aliphatic carboxylic acid amide, aliphatic monocarboxylic acid amides such as lauric acid amide, palmitic acid amide, oleic acid amide, stearic acid amide, erucic acid amide, behenic acid amide, ricinoleic acid amide and hydroxystearic acid amide, N-substituted aliphatic monocarboxylic acid amides such as N-oleyl palmitic acid amide, N-oleyl oleic acid amide, N-oleyl stearic acid amide, N-stearyl oleic acid amide, N-stearyl stearic acid amide, N-stearyl erucic acid amide, methylol stearic acid amide and methylol behenic acid amide, bis-aliphatic carboxylic acid amides such as methylene bisstearic acid amide, ethylene bislauric acid amide, ethylene biscapric acid amide, ethylene bisoleic acid amide, ethylene bisstearic acid amide, ethylene biserucic acid amide, ethylene bisbehenic acid amide, ethylene bisisostearic acid amide, ethylene bishydroxystearic acid amide, butylene bisstearic acid amide, hexamethylene bisoleic acid amide, hexamethylene bisstearic acid amide, hexamethylene bisbehenic acid amide, hexamethylene bishydroxystearic acid amide, m-xylylene bisstearic acid amide and m-xylylene bis-12-hydroxystearic acid amide, N-substituted bis-aliphatic carboxylic acid amides such as N,N'-dioleyl sebacic acid amide, N,N'-dioleyl adipic acid amide, N,N'-distearyl adipic acid amide and N,N'-distearyl sebacic acid amide are mentioned. These can be of one kind or a mixture of two kinds or more. Among them, a compound selected from aliphatic monocarboxylic acid amides, N-substituted aliphatic monocarboxylic acid amides and bis-aliphatic carboxylic acid amides is preferably used. Preferably, an amide of an aliphatic carboxylic acid of C4 to 30, more preferably of C12 to 30 with ammonia or an amine selected from aliphatic/aromatic mono-amines or di-amines of C1 to 30 is preferably used. In particular, a compound selected from palmitic acid amide, stearic acid amide, erucic acid amide, behenic acid amide, ricinoleic acid amide, hydroxystearic acid amide, N-oleyl palmitic acid amide, N-stearyl erucic acid amide, ethylene biscapric acid amide, ethylene bisoleic acid amide, ethylene bislauric acid amide, ethylene biserucic acid amide, m-xylylene bisstearic acid amide and m-xylylene bis-12-hydroxystearic acid amide is preferably used.

Furthermore, as preferable examples of the N-substituted urea, N-butyl-N'-stearyl urea, N-propyl-N'-stearyl urea, N-stearyl-N'-stearyl urea, N-phenyl-N'-stearyl urea, xylylene bisstearyl urea, toluylene bisstearyl urea, hexamethylene bisstearyl urea, diphenyl methane bisstearyl urea, diphenyl methane bislauryl urea or the like are mentioned.

Furthermore, as preferable examples of the aliphatic carboxylic acid salt, metal salts of aliphatic carboxylic acid of, preferably C4 to 30, more preferably C14 to 30 are mentioned. As concrete examples of the aliphatic carboxylic acid of C14 to 30, lauric acid, myristic acid, palmitic acid, oleic acid, stearic acid, isostearic acid, behenic acid, montanic acid or the like are mentioned. And, as examples of the metal, lithium, sodium, potassium, magnesium, calcium, barium, aluminum, zinc, silver, copper, lead, thallium, cobalt, nickel, beryllium or the like are mentioned. These may be of one kind or a mixture of two kinds or more. In particular, salts of stearic acid or salts of montanic acid are preferably used and, in particular, a compound selected from sodium stearate, potassium stearate, zinc stearate and calcium montanate is preferably used.

Furthermore, as preferable examples of the aliphatic alcohol, aliphatic alcohols of C4 to 30, more preferably of C15 to 30 are mentioned. In concrete, aliphatic monoalcohols such as pentadecyl alcohol, cetyl alcohol, heptadecyl alcohol, stearyl alcohol, nonadecyl alcohol, eicosyl alcohol, ceryl alcohol and melssyl alcohol, aliphatic polyvalent alcohols such as 1,6-hexane diol, 1,7-heptane diol, 1,8-octane diol, 1,9-nonane diol and 1,10-decane diol, cyclic alcohols such as cyclopentane-1,2-diol, cyclohexane-1,2-diol, and cyclohexane-1,4-diol, or the like are mentioned. These may be of one kind or a mixture of two kinds or more. In particular, aliphatic monoalcohols are preferably used, and especially, stearyl alcohol is preferably used.

Furthermore, as preferable examples of the aliphatic carboxylic acid ester, esters of an aliphatic carboxylic acid of preferably C4 to 30, more preferably C12 to 30 with an alcohol selected from aliphatic/aromatic monools, diol and triols of C1 to 30 are preferably used. For example, aliphatic monocarboxylic acid esters such as lauric acid cetyl ester, lauric acid phenacyl ester, myristic acid cetyl ester, myristic acid phenacyl ester, palmitic acid isopropyl ester, palmitic acid dodecyl ester, palmitic acid tetradecyl ester, palmitic acid pentadecyl ester, palmitic acid octadecyl ester, palmitic acid cetyl ester, palmitic acid phenyl ester, palmitic acid phenacyl ester, stearic acid cetyl ester and behenic acid ethyl ester, monoesters of ethylene glycol such as monolauric acid glycol, monopalmitic acid glycol and monostearic acid glycol, diesters of ethylene glycol such as dilauric acid glycol, dipalmitic acid glycol and distearic acid glycol, monoesters of glycerin such as monolauric acid glycerin ester, monomyristic acid glycerin ester, monopalmitic acid glycerin ester and monostearic acid glycerin ester, diesters of glycerin such as dilauric acid glycerin ester, dimyristic acid glycerin ester, dipalmitic acid glycerin ester and distearic acid glycerin ester, triesters of glycerin such as trilauric acid glycerin ester, trimyristic acid glycerin ester, tripalmitic acid glycerin ester, tristearic acid glycerin ester, palmitodiolein, palmitodistearin and oleodistearin, or the like are mentioned. These may be of one kind or a mixture of two kinds or more. Among these, diesters of ethylene glycol are preferable, and especially, ethylene glycol distearate is preferably used.

Furthermore, as a concrete example of the aliphatic/aromatic carboxylic acid hydrazide, sebacic acid dibenzoic acid hydrazide, as concrete examples of melamine-based compound, melamine cyanurate and melamine polyphosphate and as concrete examples of phenyl sulfonic acid metal salt, phenyl phosphorous acid zinc salt, phenyl phosphorous acid calcium salt, phenyl phosphorous acid magnesium salt or the like are mentioned.

The laminate sheet of polylactic acid-based resin of the present invention can contain various particles. By containing a particle, slipperiness between thermoforming mold and the film is improved and unevenness of thermoforming or film breakage can be decreased. And, its releasability from metal mold is improved. The average particle diameter is preferably 0.01 to 10 μm and an amount contained is, with respect to the polylactic acid-based resin 100 parts by mass, preferably 0.01 to 10 parts by mass. The average particle diameter is, more preferably 0.02 to 5 μm and still more preferably 0.03 to 2 μm. The amount contained is, more preferably 0.02 to 1 parts by mass, still more preferably 0.03 to 0.5 parts by mass. If the average particle diameter is less than 0.01 μm or the weight parts mixed is smaller than 0.01 parts by mass, the effect of slipperiness improvement between the thermoforming mold and the film decreases. On the other hand, if the average particle diameter is larger than 10 μm or the weight parts mixed is larger than 10 parts by mass, transparency of the film may decrease.

Kind of the particle is appropriately selected depending on its purpose or application, and as far as the effect of the present invention is not impaired, it is not especially limited, but an inorganic particle, an organic particle, a cross-linked polymer particle, an internal particle to be generated in polymerization system or the like can be mentioned. As a matter of course, each particle may be used alone, or may be used as a mixture. In the cases where they are used as a mixture, it is acceptable if the respective kinds of particle are in the range of the above-mentioned average particle diameter, and, the total amount contained of all kinds of particle is in the above-mentioned range.

Furthermore, to the laminate sheet of polylactic acid-based resin of the present invention, in a range where the effect of the present invention is not impaired, as required, additives, for example, a flame retardant, a heat stabilizer, a light stabilizer, an antioxidant, an anti-coloring agent, a UV absorber, an anti-static agent, a plasticizer, a tackifier, an organic lubricant such as an aliphatic acid ester or a wax, or a defoamer such as a polysiloxane, a colorant such as a pigment or a dye can be compounded in an appropriate amount.

Furthermore, for the purpose of improving blocking prevention ability, anti-staticity, imparting releasability, scratch resistance, or the like, a functional layer may be provided on surface of the laminate sheet of polylactic acid-based resin of the present invention. For forming the functional layer, an in-line coating method which is carried out in sheet production step, an off-line coating method which is carried out after sheet winding, etc., can be employed.

As concrete methods for forming such a functional layer, a wire bar coat method, a doctor blade method, a micro-gravure coat method, a gravure roll coat method, a reverse roll coat method, an air knife coat method, a rod coat method, a die coat method, a kiss coat method, a reverse kiss coat method, an impregnation method, a curtain coat method, a spray coat method, an air doctor coat method or other coat methods than these can be employed singly or in combination.

Here, as examples of the in-line coating method, a method of coating a coating liquid on an unstretched sheet and biaxially stretching it sequentially or simultaneously, a method of coating a coating liquid on a uniaxially stretched sheet and further stretching it in the direction perpendicular to the uniaxial stretching direction, or after coating said coating liquid on a biaxially oriented sheet and further stretching it, or the like are mentioned.

However, in order to improve coatability or adhesion of the coating liquid to the sheet, it is possible to subject the sheet to a chemical treatment or a discharge treatment before the coating.

It is preferable to have a mold releasing layer on at least one surface of the laminate sheet of polylactic acid-based resin. This is, although it is explained later, since the laminate sheet of polylactic acid-based resin of the present invention is, in most cases, crystallized by heat treatment in a metal mold to make it heat resistant, to improve releasability between the sheet and the mold at that time.

As such materials for the mold releasing layer, well-known materials can be used and one kind or more selected from long-chain alkyl acrylates, silicone resins, melamine resins, fluororesins, cellulose derivatives, urea resins, polyolefin resins, paraffin-based releasing agents or the like is preferably used.

Furthermore, it is preferable to have an anti-static layer on at least one surface of the laminate sheet of polylactic acid-based resin.

As materials for such an anti-static layer, well-known materials can be used, but anti-static agents which have a quaternary ammonium salt in its main chain is preferable. And, by containing a copolymer which contains at least one kind of sulfonic acid, sulfonic acid salt, vinyl imidazolium salt, diallyl ammonium chloride, dimethyl ammonium chloride and alkyl ether sulfuric acid ester, anti-static property can be imparted.

In the laminate sheet of polylactic acid-based resin of the present invention, from the points of suppressing strength decrease by degradation and improving heat resistance, it is preferable that a concentration of carboxyl group terminal of the polylactic acid-based resin which constitutes the laminate sheet is 30 equivalent/$10^3$ kg or less, more preferably 20 equivalent/$10^3$ kg or less, especially preferably 10 equivalent/$10^3$ kg or less. In the case where the concentration of carboxyl group terminal of the polylactic acid-based resin exceeds 30 equivalent/$10^3$ kg, its strength decreases by hydrolysis when the laminate sheet or a thermoformed plastic thereof is used under a high temperature/high humidity condition or under a contact condition with hot water. Therefore, in the case where it is used for an application such as container, such problems may arise that said container becomes brittle and is likely to be broken, or the like.

As methods for making the concentration of carboxyl group terminal to 30 equivalent/$10^3$ kg or less, for example, a method by controlling by catalyst or by thermal history at synthesizing the polylactic acid-based resin, a method of reducing thermal history at the time of film-forming of the sheet, a method for end-capping the carboxyl group terminal by using a reactive type compound, or the like are mentioned. As the reactive type compounds, for example, condensation reactive type compounds such as an aliphatic alcohol, an amide compound or an addition reaction type compounds such as a carbodiimide compound, an epoxy compound, an oxazoline compound are mentioned, but in view of unlikeness of generating excessive side-products at the time of the reaction, the addition reaction type compounds are preferable.

In the laminate sheet of polylactic acid-based resin of the present invention, it is preferable that an amount of lactic acid oligomer component contained in said laminate sheet is 0.5% by mass or less. More preferably it is 0.4% by mass or less, still more preferably 0.3% by mass or less. When the amount of lactic acid oligomer component contained in said laminate sheet exceeds 0.5% by mass, the lactic acid oligomer component which is left in said laminate sheet may precipitate in a powdery state or in a liquid state, and may impair handling property and transparency. And, it may accelerate hydrolysis of the polylactic acid resin and may aggravate aging characteristics of the sheet. The lactic acid oligomer component mentioned here denotes cyclic dimers (lactides) which are most representative among lactic acid, linear oligomers, cyclic oligomers or the like which are present in the sheet, i.e., LL-lactide, DD-lactide or DL(meso)-lactide.

The laminate sheet of polylactic acid-based resin of the present invention may be, mainly in view of aging resistance, a stretched sheet, and in that case, it is preferable to be a biaxially stretched sheet.

Method for obtaining the stretched sheet can be carried out by conventional stretched sheet production methods such as inflation method, simultaneous biaxial stretch method or sequential biaxial stretch method. Because it is easy to control orientation conditions in the sheet in which thermoformability and heat resistance are compatible and because it is possible to make film-forming speed high, a sequential biaxial stretch method is preferable.

Next, production method of the laminate sheet of polylactic acid-based resin is explained concretely.

The polylactic acid-based resin of the present invention can be obtained in the following way. As the raw material, a lactic acid component, L-lactic acid and/or D-lactic acid, is used but, other than the lactic acid component, a hydroxycarboxylic acid can also be used together. And, a cyclic ester intermediate, for example, lactide, glycolide or the like can also be used as a raw material. Furthermore, dicarboxylic acids or glycols can also be used together.

The polylactic acid-based resin can be obtained by a method in which the above-mentioned raw material is directly subjected to a dehydration condensation, or by a method in which the above-mentioned cyclic ester intermediate is subjected to a ring-opening polymerization. For example, in the case where it is produced by the direct dehydration condensation, lactic acids or lactic acids and hydroxycarboxylic acids are subjected to an azeotropic dehydration condensation preferably under presence of an organic solvent, preferably a phenyl ether-based solvent, and a high molecular weight polymer can be obtained by a polymerization in which the solvent distilled by the azeotropy is dewatered and the solvent containing substantially no water is returned to the reaction system. And, it is also known that a high molecular weight polymer can also be obtained by subjecting a cyclic ester intermediate such as lactide to a ring-opening polymerization under a reduced pressure and by using a catalyst such as tin octoate. At this time, a polymer of which amount of lactide is small can be obtained by employing a method in which removing conditions of water component or low molecular weight compounds in the organic solvent at heating/refluxing are controlled, a method of suppressing depolymerization reaction by deactivation of catalyst after finishing polymerization reaction, a method of heat treating the produced polymer, or the like.

Hereafter, an example of preferable method, in which an unstretched laminate sheet of polylactic acid-based resin is produced and further a sequential biaxial stretching by a tenter is carried out, is explained.

After drying a polylactic acid-based resin under a reduced pressure of 5 torr, at 100 to 150° C. for 3 hours or more, it is fed to an extruder. A resin for Layer A and a resin for Layer B are fed to respectively independent separate extruders, melted at 150 to 300° C. depending on their melt viscosities, processed in a die or out of die into a composite form, and extruded by T-die method through a slit die of a lip clearance of 2 to 3 mm. The extruded resin is closely contacted to a cooling cast drum made of a metal by statically charging it by using a wire electrode of 0.5 mm diameter, to obtain a non-oriented cast sheet.

Preferable range of surface temperature of the metallic cooling roll is 0 to 30° C., more preferable range is 3 to 25° C., still more preferable range is 5 to 20° C. By adjusting the surface temperature of the metallic cooling roll in this range, a good transparency can be exhibited.

In the case where a stretched sheet is intended, thus obtained non-oriented cast sheet is heated to a temperature at which a longitudinal stretching is carried out while being conveyed on hot rolls. For the heating, an auxiliary heating means such as an infrared heater may also be used together. Preferable range of the stretching temperature is 80 to 95° C. and more preferably 85 to 90° C. Thus heated non-oriented sheet is stretched in longitudinal direction of the sheet in one stage or in a multi-stage of 2 stages or more by applying a difference of peripheral speeds between hot rolls. The total stretch ratio is preferably 1.2 to 3.5 times and more preferably it is 1.5 to 3.0 times.

After thus uniaxially stretched sheet is once cooled, the sheet is grasped at both ends by clips and introduced into a tenter, and stretched in transverse direction. The stretching temperature is preferably 75 to 90° C. and more preferably it is 80 to 85° C. The stretch ratio is preferably 1.2 to 3.5 times and more preferably 1.5 to 3.0 times. In order to decrease difference of performance in transverse direction of the sheet, it is preferable to stretch in transverse direction at a temperature lower than the stretching temperature in longitudinal direction by 1 to 15° C. Furthermore, as required, a longitudinal re-stretching and/or a transverse re-stretching may be carried out.

Next, this stretched sheet is heat set under tension or, under relaxation in transverse direction. From the view points of mainly imparting a heat dimensional stability to the sheet, and of decreasing lactide content contained in the sheet by diffusion, preferable heat treatment temperature is 100 to 160° C. and more preferably 120 to 150° C. It is preferable that the heat treatment time is in the range of 0.2 to 30 seconds. In view of decreasing heat shrinkage in transverse direction, the relaxation ratio is preferably 1 to 8%, more preferably 2 to 5%. It is more preferable that the sheet is once cooled before subjecting to the heat set treatment.

Furthermore, if necessary, while being subjected to a relaxation treatment in longitudinal and transverse direction, the sheet is cooled to room temperature and wound, to obtain an intended laminate sheet of polylactic acid-based resin.

Next, a method for obtaining a thermoformed plastic having both of heat resistance and transparency intended in the present invention is explained in the followings.

The thermoformed plastic of the present invention includes films, bags, tubes, sheets, cups, bottles, trays and yarns, and there is no limitation in their shape, size, thickness, design, etc. Among them, various industrial materials such as shape retaining tools including blister pack used for presentation packaging of commercial goods, trays for food, bottles for display of beverage vending machine, containers including lunch box or cup for beverage, other thermoformed plastics for various wrappings and surface materials, are preferably mentioned.

As the thermoforming method, various thermoforming methods can be employed, such as a vacuum thermoforming, a vacuum pressure forming, a plug assist thermoforming, a straight forming, a free drawing, a plug and ring thermoforming, a skeleton thermoforming or the like.

In order to obtain a thermoformed plastic having both of heat resistance and transparency, it is preferable to heat treat the sheet in any stage of before thermoforming, during thermoforming and after thermoforming.

In view of heat resistance, it is preferable to control such that the calorific value accompanied by crystallization of the resin, $\Delta Hcc$, observed when temperature of Layer A is raised from 20° C. up to 220° C. at a rate of 10° C./min, becomes 20

J/g or less. When ΔHcc is in this range, Layer A is sufficiently crystallized and heat resistance of the thermoformed plastic becomes high.

The heat treatment may be done in any step, but it is preferable since, if it is done in a sheet stage before thermoforming, it becomes unnecessary to heat treat at the time of thermoforming or after thermoforming, and thermoforming cycle can be shortened. In such a case, there is also an advantage that a step such as printing on the sheet before thermoforming becomes easy due to the raised heat resistance of the sheet itself.

In the case where the sheet is heat treated before thermoforming, it is preferable to include a step of heat treatment at a temperature at which the sheet temperature becomes 80° C. or higher and lower than melting temperature of the polylactic acid-based resin for 1 second or more and 60 seconds or less. As such steps, for example, a heat cast method in which the sheet is cast on a heated casting drum in a T-die method, a method of passing the sheet on hot rolls in in-line or off-line, a method of heating the sheet by a heater in in-line or off-line or the like can be employed.

As methods of heat treating the sheet at the time of thermoforming or after thermoforming, a method of crystallizing as it is in metal mold at the time of thermoforming (hereunder, referred to as crystallization method in metal mold) and a method of heat treating amorphous thermoformed plastic made of said sheet (hereunder, referred to as post-crystallization method), can be employed.

In any of the crystallization method in metal mold and the post-crystallization method, a predetermined temperature condition of the metal mold is preferably in the temperature range between glass transition temperature (Tg) of the laminate sheet of polylactic acid-based resin and its melting temperature (Tm), more preferably, (Tg+5)° C. to (Tm−20)° C., still more preferably (Tg+10)° C. to (Tm−40)° C. In the case where the predetermined temperature is higher than Tm, even if it is crystallized in a short time, transparency of the thermoformed plastic may be impaired, or it deforms in some cases, and if it is heated for a long time, it melts in some cases. On the contrary, in a temperature lower than Tg, crystallization rate becomes significantly low. Time for keeping temperature in the heat treatment, although it depends on constitution of the laminate sheet of polylactic acid-based resin, there is especially no limitation as far as it is a time sufficient for crystallization of the thermoformed plastic or more.

EXAMPLES

The present invention is explained more concretely with reference to examples, but the present invention is not limited at all by that.

[Methods of Measurement and Evaluation]

Measurements and evaluations in the examples were carried out by the following conditions.

(1) Thermoformability

A cut sheet sample of laminate sheet of polylactic acid-based resin having a width 460 mm, a length 630 mm and a thickness 1 mm was thermoformed by using an ordinary vacuum pressure forming machine equipped with a cup-shaped metal mold of a cup diameter 80 mm, a bottom diameter 50 mm and a height 80 mm. The sheet was softened by a heater and vacuum pressed to the above-mentioned metal mold for one minute to obtain a drawn plastic. At this time, in Examples 1 to 12, the metal mold temperature was set to 110° C. And, in Examples 13 to 15, the metal mold temperature was set to 50° C.

Around the center of the side portion of the obtained cup was uniformly divided into 20 points and thickness of each point was measured. The ratio (%) of thickness of the thinnest point with respect to the thickness of the thickest point was determined and evaluated in the following criteria.
A: 90% or more
B: 80% or more and less than 90%
C: Less than 80%, or the sheet was broken, or the bottom of cup was extremely different from the cup shape of the metal mold, e.g., round.

(2) Heat Resistance of Thermoformed Plastic

By using the cup thermoformed in (1), deformation of the cup was evaluated by visual observation when it was put in a constant temperature bath of 70° C. for 2 hours.
A: No deformation
B: Deformation is small
C: Deformation is large (3) Transparency of Thermoformed Plastic Haze value at center of side portion of the cup thermoformed in (1) was measured by using a haze meter, type HGM-2DP (produced by Suga Test Instruments KK). The measurements were made 5 times for one sample, and by using average value of the 5 times measurements, it was evaluated in the following criteria.
A: Haze is less than 10%
B: Haze is 10% or more and less than 20%
C: Haze is 20% or more.

[Polylactic Acid Resin]

Polylactic acid resins used in the examples are explained.

Polylactic Acid P-1:

Polylactic acid resin of which D isomer content is 1 mol % and PMMA equivalent weight average molecular weight is 180,000.

Polylactic Acid P-2:

Polylactic acid resin of which D isomer content is 2 mol % and PMMA equivalent weight average molecular weight is 180,000.

Polylactic Acid P-3:

Polylactic acid resin of which D isomer content is 4 mol % and PMMA equivalent weight average molecular weight is 180,000.

Polylactic Acid P-4:

Polylactic acid resin of which D isomer content is 10 mol % and PMMA equivalent weight average molecular weight is 180,000.

[Resin L]

Resin L used in Examples is explained hereunder.

Resin L-1:

Polyethylene glycol of weight average molecular weight 12,000; 70 parts by mass, L-lactide 30 parts by mass and tin octoate 0.05 parts by mass were mixed and polymerized at 150° C. for 2 hours in nitrogen atmosphere in a reaction vessel equipped with a stirrer. A block copolymer L-1, of polyethylene glycol and polylactic acid, having a polylactic acid segment of a weight average molecular weight 2,500 was obtained. As to the obtained block copolymer, PMMA equivalent weight average molecular weight (Mw) measured by GPC was 17,000 and Tg<60° C.

Resin L-2:

Polypropylene glycol of weight average molecular weight 10,000; 70 parts by mass, L-lactide 30 parts by mass and tin octoate 0.05 parts by mass were mixed and polymerized at 150° C. for 2 hours in nitrogen atmosphere in a reaction vessel equipped with a stirrer. A block copolymer L-2, of polypropylene glycol and polylactic acid, having a polylactic acid segment of a weight average molecular weight 2,000 was obtained. As to the obtained block copolymer, PMMA equivalent weight average molecular weight (Mw) measured by GPC was 14,000 and Tg<60° C.

Resin L-3:

Polytrimethylene glycol of weight average molecular weight 10,000; 70 parts by mass, L-lactide 30 parts by mass and tin octoate 0.05 parts by mass were mixed and polymerized at 150° C. for 2 hours in nitrogen atmosphere in a reaction vessel equipped with a stirrer. A block copolymer L-3, of polytrimethylene glycol and polylactic acid, having a polylactic acid segment of a weight average molecular weight 2,000 was obtained. As to the obtained block copolymer, PMMA equivalent weight average molecular weight (Mw) measured by GPC was 14,000 and Tg<60° C.

Resin L-4:

Dimer acid 1 mol equivalent and propylene glycol 1.4 mol equivalents were fed to a 50 liter reaction bath equipped with a stirrer, rectifier and a gas inlet tube, and heated and stirred under nitrogen flow while raising temperature from 150° C. at a rate of 10° C. per one hour. After raising the temperature up to 220° C. while distilling off water produced, they were heated and stirred at 220° C. for 2 hours. After that, titanium tetraisopropoxide 70 ppm was added as an ester exchange catalyst, vacuumed to 0.1 kPa and stirred for 3 hours to obtain an aliphatic polyester. As to the obtained aliphatic polyester, polystyrene equivalent number average molecular weight (Mn) measured by GPC was 18,000 and weight average molecular weight (Mw) was 30,000. This aliphatic polyester 50 parts by mass and a polylactic acid, of which ratio in mass of L isomer and D isomer (L/D) is 100/0, 50 parts by mass were mixed and kneaded at 230° C. by using a twin-screw extruder (The Japan Steel Works, TEX30α) to obtain a lactic acid-based polyester L-4. As to the obtained polymer, PMMA equivalent number average molecular weight (Mn) measured by GPC was 25,000, weight average molecular weight (Mw) was 50,000 and the glass transition temperature (Tg) was 53° C.

Resin L-5:

Polybutylene succinate/adipate (EnPol (registered trademark) G4460 produced by Ire Chemical, PMMA equivalent weight average molecular weight measured by GPC (Mw)= 80,000 and Tg=−45° C.)

[Preparation of Nucleating Agent Master Pellet]

Polylactic acid (P-1)/ethylene bislauric acid amide (EBLA):

Polylactic acid (P-1) 97 parts by mass, ethylene bislauric acid amide (EBLA) (NOF Corporation, Alflow (registered trademark) AD-212) 3 parts by mass were mixed and kneaded by using a well known twin-screw extruder at 220° C. to make a master pellet.

Other master pellets were also made in the same way by changing the kind of polylactic acid and the kind of nucleating agent.

Preparation of Laminate Sheet of Polylactic Acid-Based Resin

Example 1

As Layer A, a mixed material so prepared that EBLA is 1 wt % by using Polylactic acid (P-1) and the master pellet, and as Layer B, a mixed material so prepared that EBLA is 0.2 wt % and Resin (L-1) is 20 wt % by using Polylactic acid (P-1), the master pellet and Resin (L-1). The each mixed material was fed to a respectively independent and separate extruder, and co-extruded from a T-die of which temperature was 210° C. and cast on a drum cooled to 10° C. to obtain a laminate sheet of polylactic acid-based resin. Thickness of the obtained sheet was 1 mm, thickness ratio of Layer A:Layer B:Layer A was 1:8:1.

Results are shown in Table 1.

Examples 2 to 12 and Comparative examples 1 to 5

Example 1 was repeated in the same way except changing the polylactic acid resin, nucleating agent and Resin L constituting the each layer to those shown in Tables 1 to 3. The results are shown in Tables 1 to 3.

TABLE 1

| | | | Example 1 | Example 2 | Example 3 | Example 4 | Example 5 | Example 6 |
|---|---|---|---|---|---|---|---|---|
| Layer A | Polylactic acid resin | Kind/Da (mol %) | P-1/1 | P-1/1 | P-1/1 | P-1/1 | P-1/1 | P-1/1 |
| | Nucleating agent | Kind | EBLA | EA | EBLA | EBLA | EBLA | EBLA |
| | | Amount Xa (% by mass) | 1 | 1 | 2.5 | 0.2 | 1 | 1 |
| | Resin L | Kind | — | — | — | — | — | L-1 |
| | | Amount (% by mass) | — | — | — | — | — | 20 |
| Layer B | Polylactic acid resin | Kind/Db (mol %) | P-2/2 | P-2/2 | P-2/2 | P-2/2 | P-2/2 | P-2/2 |
| | Nucleating agent | Kind | EBLA | EA | EBLA | EBLA | EBLA | EBLA |
| | | Amount Xb (% by mass) | 0.2 | 0.2 | 0.5 | 0.04 | 0.2 | 0.2 |
| | Resin L | Kind | L-1 | L-1 | L-1 | L-1 | — | L-1 |
| | | Amount (% by mass) | 20 | 20 | 20 | 20 | — | 20 |
| Layer Constitution | | | A/B/A | A/B/A | A/B/A | A/B/A | A/B/A | A/B/A |
| Thickness Ratio | | | 1/8/1 | 1/8/1 | 0.5/9/0.5 | 1/8/1 | 1/8/1 | 1/8/1 |
| Thickness of Sheet (mm) | | | 1 | 1 | 1 | 1 | 1 | 1 |
| Thermoformability | | | A | A | B | A | B | A |
| Heat resistance | | | A | A | A | B | A | A |
| Transparency | | | A | A | A | B | A | B |

TABLE 2

| | | | Example 7 | Example 8 | Example 9 | Example 10 | Example 11 | Example 12 |
|---|---|---|---|---|---|---|---|---|
| Layer A | Polylactic acid resin | Kind/Da (mol %) | P-2/2 | P-1/1 | P-1/1 | P-1/1 | P-1/1 | P-1/1 |
| | Nucleating agent | Kind | EBLA | EBLA | EBLA | EBLA | EBLA | SDBH |
| | | Amount Xa (% by mass) | 1 | 1 | 1 | 1 | 1 | 1 |
| | Resin L | Kind | — | — | — | — | L-5 | — |
| | | Amount (% by mass) | — | — | — | — | 1 | — |

TABLE 2-continued

|  |  |  | Example 7 | Example 8 | Example 9 | Example 10 | Example 11 | Example 12 |
|---|---|---|---|---|---|---|---|---|
| Layer B | Polylactic acid resin | Kind/Db (mol %) | P-3/4 | P-1/1 | P-2/2 | P-2/2 | P-2/2 | P-2/2 |
|  | Nucleating agent | Kind | EBLA | EBLA | EBLA | EBLA | EBLA | SDBH |
|  |  | Amount Xb (% by mass) | 0.2 | 0.2 | 0.2 | 0.2 | 0.2 | 0.1 |
|  | Resin L | Kind | L-1 | L-1 | L-2 | L-3 | L-5 | — |
|  |  | Amount (% by mass) | 20 | 20 | 20 | 20 | 1 | — |
| Layer Constitution |  |  | A/B/A | A/B/A | A/B/A | A/B/A | A/B/A | A/B/A |
| Thickness Ratio |  |  | 1/8/1 | 1/8/1 | 1/8/1 | 1/8/1 | 1/8/1 | 1/8/1 |
| Thickness of Sheet (mm) |  |  | 1 | 1 | 1 | 1 | 1 | 1 |
| Thermoformability |  |  | A | B | A | A | A | A |
| Heat resistance |  |  | A | A | A | A | A | A |
| Transparency |  |  | A | A | A | A | A | B |

TABLE 3

|  |  |  | Comp. ex. 1 | Comp. ex. 2 | Comp. ex. 3 | Comp. ex. 4 | Comp. ex. 5 |
|---|---|---|---|---|---|---|---|
| Layer A | Polylactic acid resin | Kind/Da (mol %) | P-1/1 | P-1/1 | P-1/1 | — | P-2/2 |
|  | Nucleating agent | Kind | EBLA | EBLA | — | — | EBLA |
|  |  | Amount Xa (% by mass) | 1 | 1 | — | — | 1 |
|  | Resin L | Kind | — | — | — | — | — |
|  |  | Amount (% by mass) | — | — | — | — | — |
| Layer B | Polylactic acid resin | Kind/Db (mol %) | P-2/2 | P-2/2 | P-2/2 | P-4/10 | P-4/10 |
|  | Nucleating agent | Kind | EBLA | — | — | EBLA | — |
|  |  | Amount Xb (% by mass) | 1 | — | — | 1 | — |
|  | Resin L | Kind | L-1 | L-1 | L-1 | L-4 | L-4 |
|  |  | Amount (% by mass) | 20 | 20 | 20 | 10 | 10 |
| Layer Constitution |  |  | A/B/A | A/B/A | A/B/A | monolayer | A/B/A |
| Thickness Ratio |  |  | 1/8/1 | 1/8/1 | 1/8/1 | — | 1/2/1 |
| Thickness of Sheet (mm) |  |  | 1 | 1 | 1 | 1 | 1 |
| Thermoformability |  |  | C | A | B | C | A |
| Heat resistance |  |  | A | C | C | A | C |
| Transparency |  |  | A | C | C | B | C |

In the above-mentioned Tables 1 to 3,
EBLA: ethylene bislauric acid amide
EA: erucic acid amide
SDBH: sebacic acid dibenzoic acid hydrazide.

Any of the laminate sheets of polylactic acid-based resin of the examples were good in thermoformability, and the heat resistance and transparency of thermoformed plastics obtained from said sheet were also good.

On the other hand, in the comparative examples, although heat resistance and transparency of the thermoformed plastic were good when the amount of the nucleating agent contained in Layer A and Layer B were same, thermoformability remarkably aggravated because influence of crystallization of the sheet by heat at the time of thermoforming was significant (Comparative example 1). And, in the case where the nucleating agent was contained in Layer A only and the nucleating agent was not contained in Layer B entirely, although thermoformability was improved, heat resistance and transparency of the thermoformed plastics were poor because a fine crystallization in Layer B did not occur (Comparative examples 2 and 5). Furthermore, in the case where both of Layer A and Layer B did not contain a nucleating agent, heat resistance and transparency of the thermoformed plastic were poor as expected (Comparative example 3). Furthermore, in the case of the monolayer sheet of polylactic acid containing the nucleating agent, thermoformability was poor (Comparative example 4).

Example 13

It was carried out in the same way as Example 1 except heating the cast drum to a temperature of 100° C. At this time, contact time of the sheet with the heated drum was 20 seconds. And, the time when sheet temperature was 100° C. or higher was 20 seconds. Results are shown in Table 4.

Example 14

It was carried out in the same way as Example 1 except conveying the obtained sheet on rolls heated to 110° C. At this time, contact time of the sheet with the heated drum was 20 seconds. And, the time when sheet temperature was 100° C. or higher was 15 seconds. Results are shown in Table 4.

Example 15

It was carried out in the same way as Example 1 except introducing the obtained sheet into a tenter by grasping both ends thereof and heating such that the sheet temperature became 110° C. or higher. At this time, the time when sheet temperature was 110° C. or higher was 15 seconds. Results are shown in Table 4.

TABLE 4

|  |  |  | Example 13 | Example 14 | Example 15 |
|---|---|---|---|---|---|
| Layer A | Polylactic acid resin | Kind/Da (mol %) | P-1/1 | P-1/1 | P-1/1 |
|  | Nucleating agent | Kind | EBLA | EBLA | EBLA |
|  |  | Amount Xa (% by mass) | 1 | 1 | 1 |
|  | Resin L | Kind | — | — | — |
|  |  | Amount (% by mass) | — | — | — |
| Layer B | Polylactic acid resin | Kind/Db (mol %) | P-2/2 | P-2/2 | P-2/2 |
|  | Nucleating agent | Kind | EBLA | EBLA | EBLA |
|  |  | Amount Xb (% by mass) | 0.2 | 0.2 | 0.2 |
|  | Resin L | Kind | L-1 | L-1 | L-1 |
|  |  | Amount (% by mass) | 20 | 20 | 20 |
| Layer Constitution |  |  | A/B/A | A/B/A | A/B/A |
| Thickness Ratio |  |  | 1/8/1 | 1/8/1 | 1/8/1 |
| Thickness of Sheet (mm) |  |  | 1 | 1 | 1 |
| ΔHcc |  |  | 12.8 | 8.9 | 7.3 |
| Thermoformability |  |  | A | A | A |
| Heat resistance |  |  | A | A | A |
| Transparency |  |  | A | A | A |

INDUSTRIAL APPLICABILITY

The laminate sheet of polylactic acid-based resin of the present invention can be employed in wide applications, such as shape retaining tools including blister pack used for presentation packaging of commercial goods, trays for food, bottles for display of beverage vending machine, containers including lunch box or cup for beverage, other thermoformed plastics for various wrappings and various industrial materials including surface materials.

The laminate sheet of polylactic acid-based resin of the present invention can be applied to various thermoforming methods such as vacuum thermoforming, vacuum pressure forming, plug assist molding, straight forming, free drawing, plug and ring thermoforming and skeleton thermoforming, and has a high thermoformability. And, it can preferably be used, in particular, for various shape retaining tools and wrapping materials such as container in which heat resistance and transparency are required.

The invention claimed is:

1. A laminate sheet of polylactic acid-based resin comprising Layer A and Layer B consisting of polylactic acid-based resin composition and both of said Layer A and said Layer B contain a nucleating agent, and said Layer A and said Layer B satisfy the following conditions (1) and (2):

$$0 < Xb < Xa \quad (1)$$

wherein,
  Xa: containing ratio of the nucleating agent with respect to the whole polylactic acid-based resin composition constituting said Layer A (by mass %)
  Xb: containing ratio of the nucleating agent with respect to the whole polylactic acid-based resin composition constituting said Layer B (by mass %)

$$Da < Db, \; 1.2 \leq Db \leq 10 \quad (2)$$

wherein,
  a relation of a containing ratio Da (mol %) of D-lactic acid unit in the polylactic acid-based resin constituting said Layer A and a containing ratio of D-lactic acid unit Db (mol %) in the polylactic acid-based resin constituting said Layer B is Da<Db.

2. The laminate sheet according to claim 1 which has a laminate structure containing at least 3 layers in which said Layers A are disposed on both sides of said Layer B.

3. The laminate sheet according to claim 2, wherein a thickness ratio of Layer A with respect to the whole thickness of the laminate sheet of polylactic acid-based resin is 0.1% or more and less than 50%.

4. The laminate sheet according to claim 1, wherein at least one layer selected from said Layer A and said Layer B contains 0.1 to 40% by mass of Resin L of which glass transition temperature is 60° C. or lower with respect to the whole polylactic acid-based resin composition which forms said layer.

5. The laminate sheet according to claim 4, wherein said Resin L is a block copolymer of polyester or polyalkylene ether with polylactic acid.

6. The laminate sheet according to claim 1, wherein a calorific value ΔHcc accompanied by crystallization of the resin observed when temperature of said Layer A is raised from 20° C. up to 220° C. at a rate of 10° C./min is 20 J/g or less.

7. A laminate sheet of polylactic acid-based resin comprising Layer A and Layer B consisting of polylactic acid-based resin composition and both of said Layer A and said Layer B contain a nucleating agent, and said Layer A and said Layer B satisfy the following conditions (1) and (2):

$$0 < 3Xb \leq Xa, \; 0.3 \leq Xa \leq 2, \; 0.06 \leq Xb \leq 0.4 \quad (1)$$

wherein,
  Xa: containing ratio of the nucleating agent with respect to the whole polylactic acid-based resin composition constituting said Layer A (by mass %)
  Xb: containing ratio of the nucleating agent with respect to the whole polylactic acid-based resin composition constituting said Layer B (by mass %)

$$Da < Db, \; 1.2 \leq Db \leq 10 \quad (2)$$

wherein,
  a relation of a containing ratio Da (mol %) of D-lactic acid unit in the polylactic acid-based resin constituting said Layer A and a containing ratio of D-lactic acid unit Db (mol %) in the polylactic acid-based resin constituting said Layer B is Da<Db.

8. A thermoformed plastic comprising the laminate sheet according to claim 1.

9. The laminate sheet according to claim 7, wherein the nucleating agent comprises aliphatic carboxylic acid amide.

10. The laminate sheet according to claim 1, wherein the nucleating agent comprises aliphatic carboxylic acid amide.

* * * * *